United States Patent
Rose et al.

(10) Patent No.: US 11,782,774 B2
(45) Date of Patent: Oct. 10, 2023

(54) IMPLEMENTING OPTIONAL SPECIALIZATION WHEN COMPILING CODE

(71) Applicant: Oracle International Corporation, Redwood Shores, CA (US)

(72) Inventors: John Robert Rose, San Jose, CA (US); Maurizio Cimadamore, Donabate (IE); Brian Goetz, Williston, VT (US)

(73) Assignee: Oracle International Corporation, Redwood Shores, CA (US)

( * ) Notice: Subject to any disclaimer, the term of this patent is extended or adjusted under 35 U.S.C. 154(b) by 77 days.

(21) Appl. No.: 17/571,329

(22) Filed: Jan. 7, 2022

(65) Prior Publication Data

US 2022/0300264 A1   Sep. 22, 2022

Related U.S. Application Data

(60) Provisional application No. 63/163,723, filed on Mar. 19, 2021, provisional application No. 63/163,726, (Continued)

(51) Int. Cl.
*G06F 9/54* (2006.01)
*G06F 8/41* (2018.01)
(Continued)

(52) U.S. Cl.
CPC ............ *G06F 9/547* (2013.01); *G06F 8/41* (2013.01); *G06F 8/437* (2013.01);
(Continued)

(58) Field of Classification Search
None
See application file for complete search history.

(56) References Cited

U.S. PATENT DOCUMENTS 10,929,106 B1  2/2021 Sridhar
10,983,771 B1  4/2021 Hegarty et al.
(Continued)

FOREIGN PATENT DOCUMENTS

EP   1533696 A2   5/2005
EP   1588235 A2   10/2005
(Continued)

OTHER PUBLICATIONS

"clojure.spec—Rationale and Overview," Retrieved at https://clojure.org/about/spec, Retrieved on Jan. 17, 2022, pp. 1-15.
(Continued)

*Primary Examiner* — Qing Chen
(74) *Attorney, Agent, or Firm* — Invoke

(57) ABSTRACT

A compiler is capable of compiling instructions that do or do not supply specialization information for a generic type. The generic type is compiled into an unspecialized type. If specialization information was supplied, the unspecialized type is adorned with information indicating type restrictions for application programming interface (API) points associated with the unspecialized type, which becomes a specialized type. A runtime environment is capable of executing calls to a same API point that do or do not indicate a specialized type, and is capable of executing calls to a same API point of objects of an unspecialized type or of objects of a specialized type. When the call to an API point indicates a specialized type, and the specialized type matches that of the object (if the API point belongs to an object), then a runtime environment may perform optimized accesses based on type restrictions derived from the specialized type.

20 Claims, 12 Drawing Sheets

Related U.S. Application Data filed on Mar. 19, 2021, provisional application No. 63/163,697, filed on Mar. 19, 2021, provisional application No. 63/163,701, filed on Mar. 19, 2021.

(51) Int. Cl.

| | | |
|---|---|---|
| *G06F 16/28* | (2019.01) | |
| *G06F 16/22* | (2019.01) | |
| *G06F 9/448* | (2018.01) | |
| *G06F 9/445* | (2018.01) | |
| *G06F 9/30* | (2018.01) | |
| *G06F 9/451* | (2018.01) | |
| *G06F 12/02* | (2006.01) | |
| *G06F 9/455* | (2018.01) | |

(52) U.S. Cl.
CPC ........ *G06F 9/30076* (2013.01); *G06F 9/4488* (2018.02); *G06F 9/4494* (2018.02); *G06F 9/4498* (2018.02); *G06F 9/44521* (2013.01); *G06F 9/44536* (2013.01); *G06F 9/451* (2018.02); *G06F 9/45516* (2013.01); *G06F 9/541* (2013.01); *G06F 9/542* (2013.01); *G06F 9/548* (2013.01); *G06F 12/023* (2013.01); *G06F 16/2272* (2019.01); *G06F 16/2291* (2019.01); *G06F 16/289* (2019.01)

(56) References Cited

U.S. PATENT DOCUMENTS

| | | |
|---|---|---|
| 2001/0013065 A1 | 8/2001 | Patki et al. |
| 2006/0080644 A1* | 4/2006 | Fuhrer .................. G06F 8/51 717/137 |
| 2006/0101032 A1 | 5/2006 | Sutter et al. |
| 2007/0006141 A1* | 1/2007 | Bracha .................. G06F 9/4488 717/108 |
| 2007/0156845 A1 | 7/2007 | Devanneaux et al. |
| 2007/0245325 A1 | 10/2007 | Lapounov et al. |
| 2009/0182760 A1 | 7/2009 | Box et al. |
| 2010/0114843 A1 | 5/2010 | Farrar et al. |
| 2010/0146013 A1 | 6/2010 | Mather |
| 2011/0283263 A1 | 11/2011 | Gagliardi et al. |
| 2012/0166953 A1 | 6/2012 | Affronti et al. |
| 2013/0067155 A1 | 3/2013 | Bates et al. |
| 2013/0080736 A1 | 3/2013 | Meirowitz et al. |
| 2015/0277899 A1* | 10/2015 | Hamby .................. G06F 9/4552 717/120 |
| 2015/0301840 A1 | 10/2015 | Goetz et al. |
| 2016/0094625 A1 | 3/2016 | Sengodan et al. |
| 2016/0162924 A1 | 6/2016 | Rathod |
| 2016/0357586 A1 | 12/2016 | Rose |
| 2017/0039043 A1 | 2/2017 | Haupt et al. |
| 2017/0116007 A1 | 4/2017 | Cimadamore et al. |
| 2017/0123771 A1 | 5/2017 | Smith |
| 2018/0018151 A1 | 1/2018 | Goetz et al. |
| 2018/0150495 A1 | 5/2018 | Hoff et al. |
| 2018/0268158 A1 | 9/2018 | Bateman et al. |
| 2018/0285361 A1 | 10/2018 | Buckley et al. |
| 2018/0293058 A1 | 10/2018 | Bierman et al. |
| 2019/0073227 A1 | 3/2019 | Zhong |
| 2020/0019423 A1 | 1/2020 | Marks et al. |
| 2020/0026530 A1 | 1/2020 | Rose et al. |
| 2021/0240619 A1 | 8/2021 | Earnshaw |
| 2022/0067105 A1 | 3/2022 | Vodovotz et al. |

FOREIGN PATENT DOCUMENTS

| | | |
|---|---|---|
| EP | 1640859 A2 | 3/2006 |
| WO | 2004/068292 A2 | 8/2004 |
| WO | 2015/164438 A1 | 10/2015 |

OTHER PUBLICATIONS

"Common Descriptor Concepts," Retrieved at https://www.eclipse.org/eclipselink/documentation/2.6/concepts/descriptors001.htm, Retrieved on Oct. 31, 2017, pp. 1-6.

"JEP 218: Generics over Primitive Types" Retrieved at https://openjdk.java.net/jeps/218, Retrieved on 2022, pp. 1-4.

"Project Valhalla" Retrieved at https://openjdk.java.net/projects/valhalla/, Retrieved on Dec. 2021, pp. 1-3.

"Statically typed Javascript: Why and How," Retrieved at https://developerhowto.com/2019/01/05/statically-typed-javascript-why-and-how/, Retrieved on Jan. 2019, pp. 1-6.

"Template Classes in the VM" Retrieved at http://cr.openjdk.java.net/~jrose/values/template-classes.html, Retrieved on Nov. 2017, pp. 1-15.

Buckle N., "Restricted data types, specification and enforcement of invariant properties of variables," ACM SIGPLAN Notices, vol. 12, Issue 3, Mar. 1977, pp. 68-76.

Cimadamore I, M., "Constructs and Applications of Generic Programming in Object-Oriented Languages," University of Bologna, 2010, pp. 208.

Kennedy A., et al., "Design and Implementation of Generics for the .NET Common Language Runtime," ACM SIGPLAN Notices, vol. 36, Issue 5, May 2001, pp. 1-12.

Malabarba S, et al., "Runtime Support for Type-Safe Dynamic Java Classes," Lecture Notes in Computer Science, vol. 1850, 2000, pp. 337-361.

Rose J., "Template Class Challenges" Retrieved at http://cr.openjdk.java.net/~jrose/values/Templates-2019-0325.pdf, Retrieved on Mar. 2019, pp. 1-16.

Rose J., "The Saga of the Parametric VM," Retrieved at http://rosehome.org/work/pvm20211216/parametric-vm.pdf, Retrieved on Jan. 2021, pp. 1-33.

Wikipedia., "Entity-relationship model," Retrieved at https://en.wikipedia.org/wiki/Entity%E2%80%93relationship_model, Retrieved on Dec. 2021, pp. 1-12.

* cited by examiner

IMPLEMENTING OPTIONAL SPECIALIZATION WHEN COMPILING CODE

RELATED APPLICATIONS; INCORPORATION BY REFERENCE

This application hereby incorporates by reference the following applications: Application No. 63/163,697, filed on Mar. 19, 2021, titled "Dynamically Imposed Field and Method Type Restrictions For Managed Execution Environments"; Application No. 63/163,701, filed on Mar. 19, 2021, titled "Optional Specialization of Generic Types and Methods"; Application No. 63/163,723, filed on Mar. 19, 2021, titled "Encapsulated Specialization of Dynamically-Linked API Points"; Application No. 63/163,726, filed on Mar. 19, 2021, titled "Pointwise and Replicative Type Specializations"; application Ser. No. 17/571,323, filed on Jan. 7, 2022 titled "Dynamically-Imposed Field and Method Type Restrictions for Managed Execution Environments"; application Ser. No. 17/571,328, filed on Jan. 7, 2022 titled "Implementing Optional Specialization When Executing Code"; application Ser. No. 17/571,335, filed on Jan. 7, 2022 titled "Determining different resolution states for a parametric constant in different contexts"; application Ser. No. 17/571,340, filed on Jan. 7, 2022 titled "Determining a resolution state of an anchor constant associated with an application programming interface (API) point"; application Ser. No. 17/571,343, filed on Jan. 7, 2022 titled "Executing a parametric method within a specialized context"; application Ser. No. 17/571,349, filed on Jan. 7, 2022 titled "Instantiating a parametric class within a specialized context"; application Ser. No. 17/571,353, filed on Jan. 7, 2022 titled "Accessing a parametric field within a specialized context"; application Ser. No. 17/571,356, filed on Jan. 7, 2022 titled "Implementing a type restriction that restricts to a non-polymorphic layout type or a maximum value"; application Ser. No. 17/571,359, filed on Jan. 7, 2022 titled "Implementing a type restriction that restricts to a singleton value or zero values" and application Ser. No. 17/571,379, filed on Jan. 7, 2022 titled "Implementing a type restriction that restricts to a maximum or specific element count". The Applicant hereby rescinds any disclaimer of claim scope in the parent application or the prosecution history thereof and advises the USPTO that the claims in this application may be broader than any claim in the parent application.

TECHNICAL FIELD

The present disclosure relates to managed runtime environments. In particular, the present disclosure relates to optional specialization of generic types and methods.

BACKGROUND

Many languages and managed runtimes support parametric polymorphism of types (including classes and interfaces) and methods (including constructors and other functions). This solves problems related to type safety (finding bugs from mismatches between forms of a polymorphic API point) and optimization (customizing code and data structures for better performance).

In managed runtimes, such as CLR, parametric polymorphism support is achieved by having the managed runtime type parameters ("type holes" like T in List<T>) in its foundational system of type descriptors. In the managed runtime system, types with holes in them are not usable until the holes are filled. Data and containers can have the same generic type, but if the holes are filled with different type arguments, the type descriptors are not allowed to match, and the types do not interoperate, since that would cause an error in strong typing.

In compile-time templating systems, such as C++, parametric polymorphism support is achieved by demanding that templates per se are not the subjects of computation, but rather only instances of templates, which are provided with all necessary template arguments before use.

In managed languages, types such as "dynamic" or "Object" can be used in an effort to utilize a generic type. However, values which have been instantiated with the more generic types must be explicitly cast to a usable non-generic type to be re-introduced into the static type system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
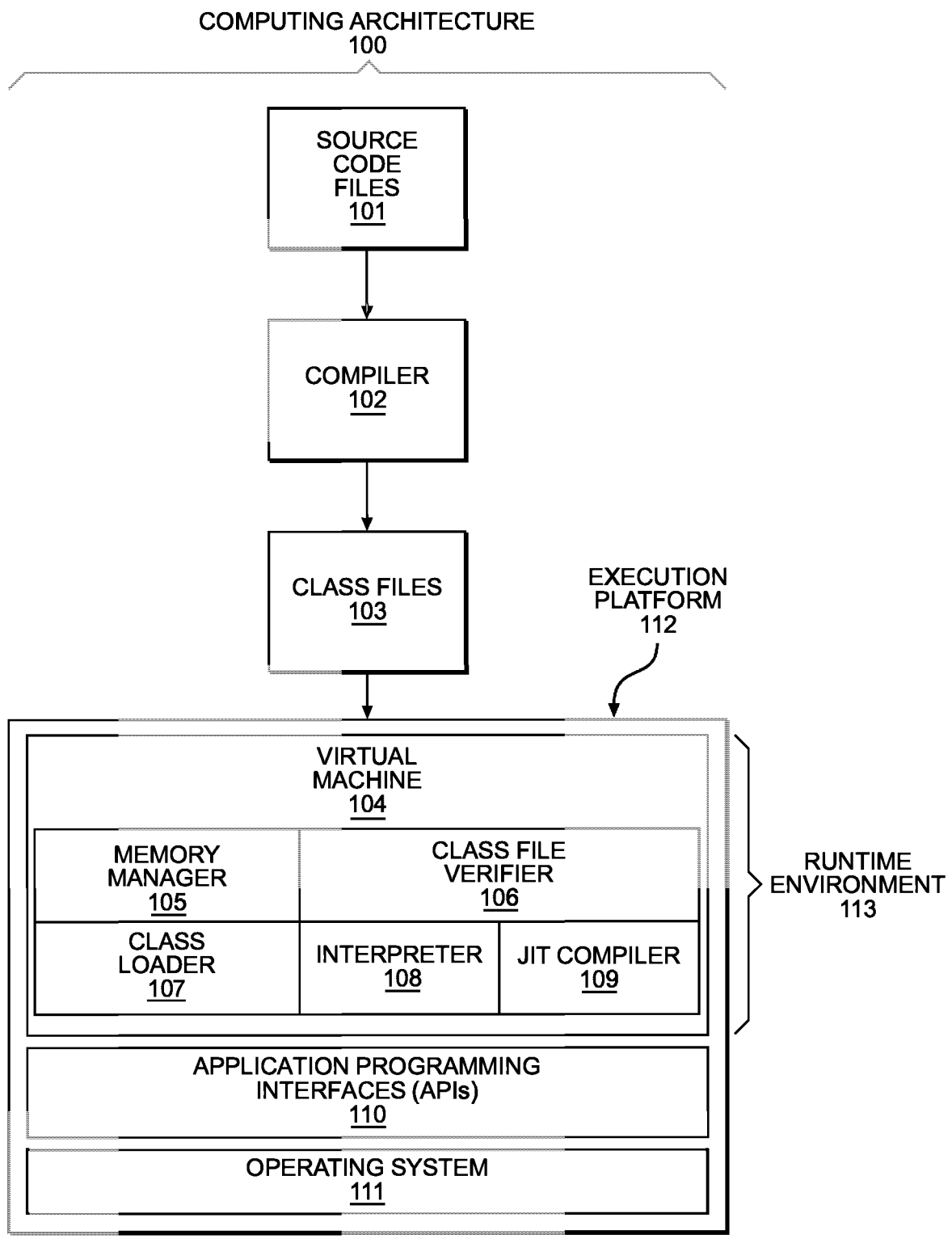
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. SPECIALIZED AND UNSPECIALIZED TYPES
4. SPECIALIZED AND UNSPECIALIZED TYPES IN CODE AND HEAP
5. COMPILING ACCESS TO SPECIALIZED AND UNSPECIALIZED TYPES
6. USING SPECIALIZED AND UNSPECIALIZED TYPES
7. MISCELLANEOUS; EXTENSIONS
8. HARDWARE OVERVIEW

1. General Overview

One or more embodiments include unspecialized types (e.g., a raw List type instead of a specialized List<int>), which have a privileged position relative to specialized types. The system merges aspects of dynamic typing and/or unspecialized (raw) types and fully tracks reified generic type instances (such as List<int>).

Specifically, the system allows users to work with fully specialized types (e.g., List<int> instead of unspecialized List or existential type List <?>), and provides optimization for consistent use of the specialized types. The type specializations may be propagated into data layouts and method calling sequences. However, the managed runtime also allows unspecialized types to co-exist along all paths that accept any specific instance.

Thus, wherever List <int> is allowed, the unspecialized List is also allowed, a different specialized type (e.g., List <double>) is not allowed. Likewise, the unspecialized List is also permitted wherever List<double> is allowed, even though List<int> is not allowed in such places.

Accordingly, there is a binary selection whenever a specialized type is used. In particular, the only allowed types that match the specialized type are the same specialized type, or a corresponding unspecialized type. When presented with just two possibilities (e.g., unspecialized List or specialized List<int>), the optimizer (e.g., the Just-In-Time compiler) is capable of producing code that is as good as if there were just one possibility (e.g., just List <int>), if one of the possibilities can be excluded as unlikely (via speculation with a slow path fallback), or if the two possibilities can be tested for early enough (via loop unswitching or method customization). Such optimizations are routine in modern language implementations, especially managed runtimes which benefit from on-line profiling but do not need to pre-compile code for every possibility.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
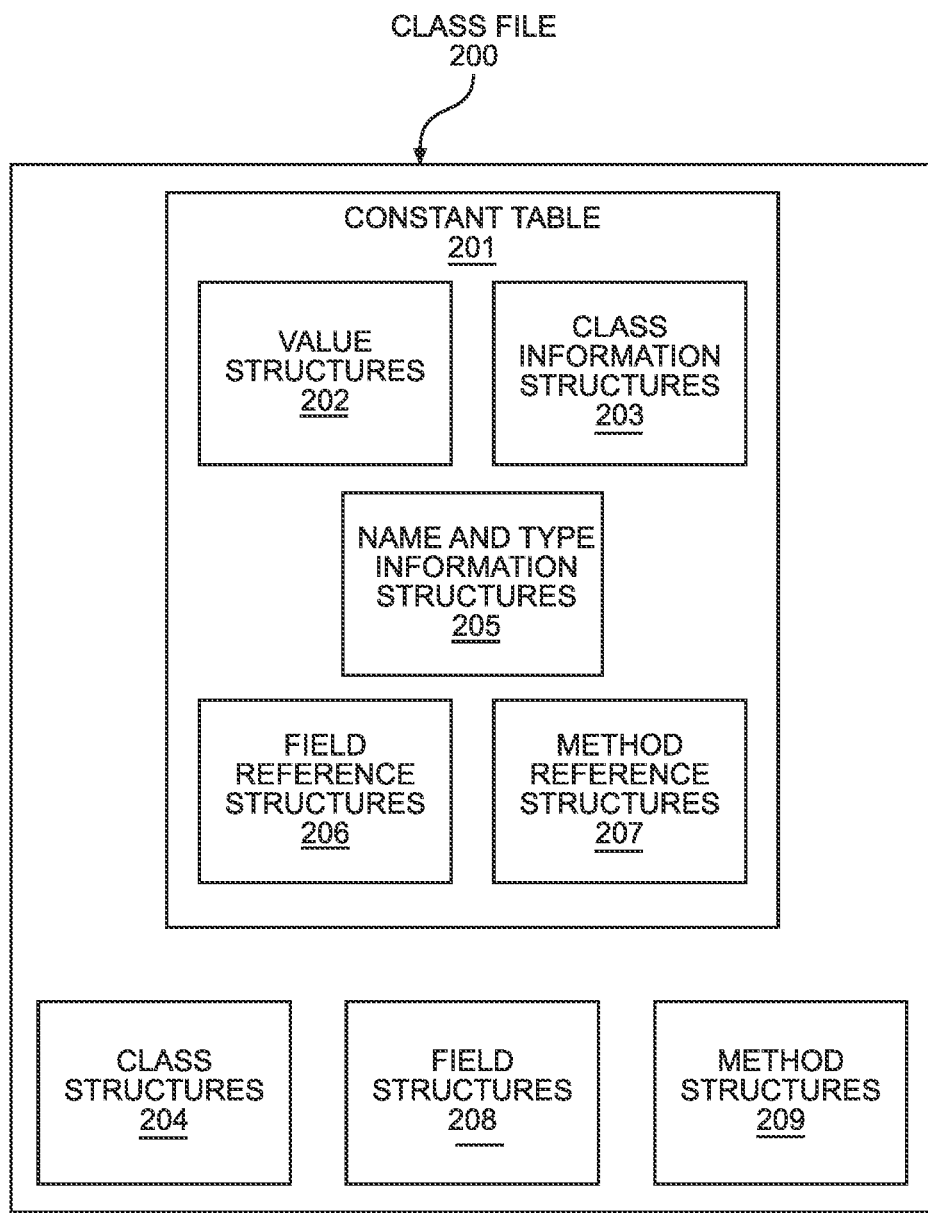
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 205 that provides the name and descriptor of the field. Method reference structures 206 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 (also referred to as "class metadata") includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
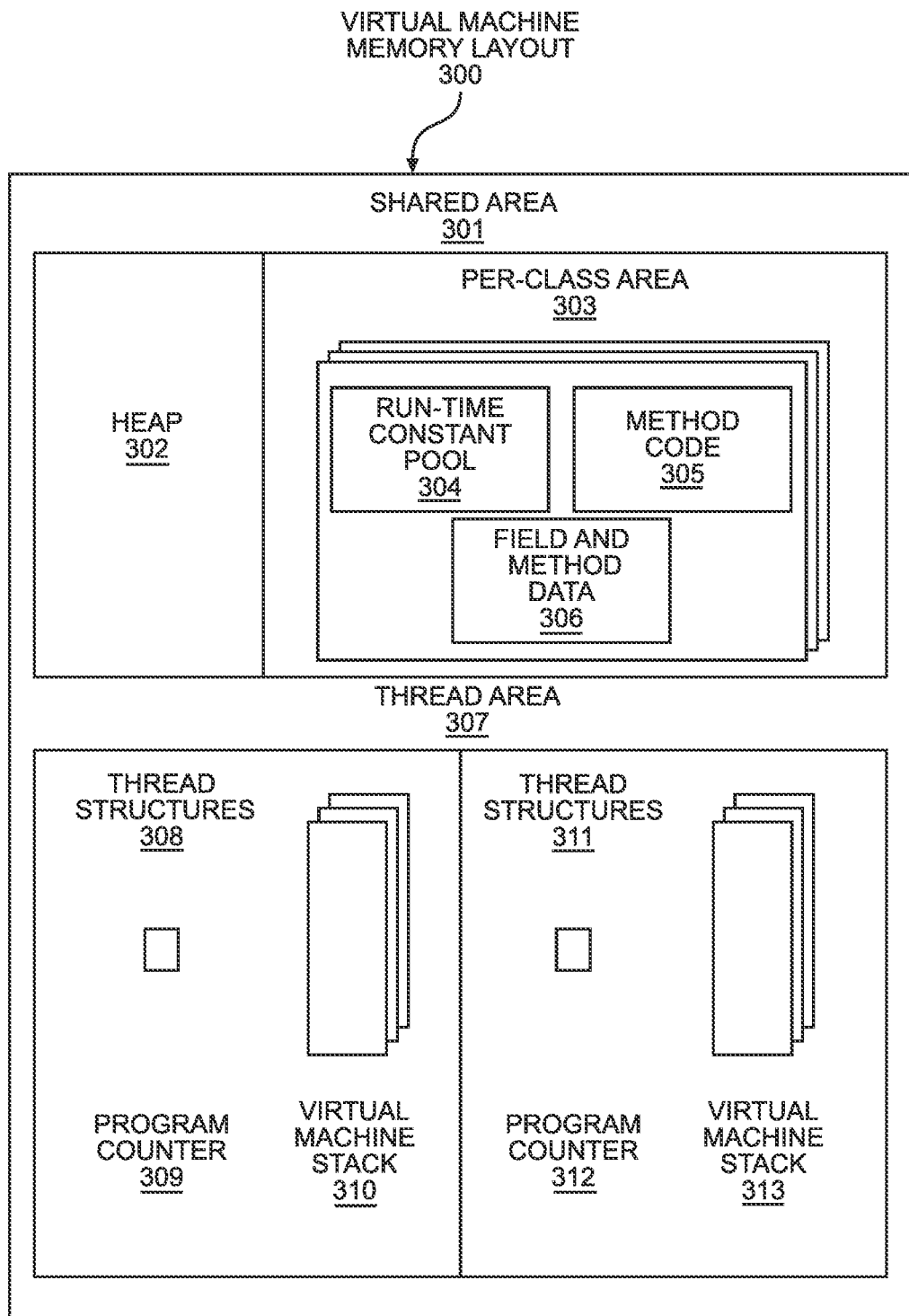
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
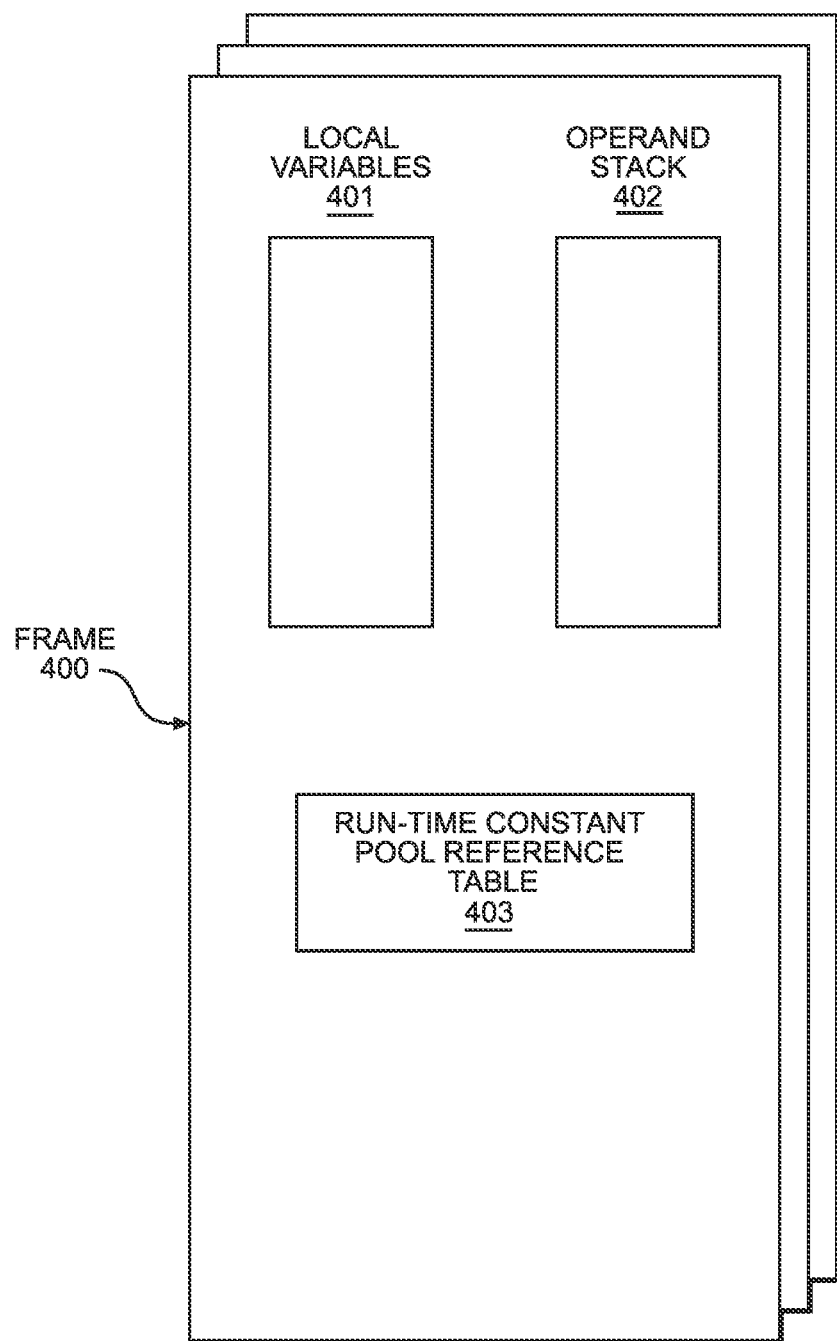
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Specialized and Unspecialized Types

In source code, an unspecialized generic type may be indicated by a type name (e.g., List). In the List example below, the unspecialized generic type may include a single block of code capable of operating on heterogenous list, which may include elements having varied types:

List rawL=new ArrayList( );
rawL.add("Hello");
rawL.add(1);
rawL.add(Foo.class);

The above code creates an object rawL of an unspecialized list type (e.g., List). The above code also adds three elements of three different types (String, int, and Class respectively) to the created list.

Because the unspecialized types may include data of any data type, as shown above, it is important that type checks occur in close proximity to where the data element is used. For example, consider the following code, which operates on the above example List rawL:

String s1=(String)rawL.get(0);
String s2=(String)rawL.get(1);

The assignment of s1 will complete successfully because element 0 of List rawL is of the type String (e.g., the String "Hello" as assigned above). However, the assignment of s2 will fail and cause an exception (e.g., a ClassCastException) to be thrown, indicating that the type of element 1 of the List rawL does not match the type of s2 (e.g., because the type of s2 is String, and the type of element 1 of List rawL is int).

In source code, a specialized type may be indicated by a type name and a type descriptor indicating a specific data type on which the specialized type operates. In the List example below, the specialized type List<int> is a type named List, and operates only on objects of type List that contain elements of the integer (int) type:

List<int> intList=new ArrayList<int> ( );
    intList.add("Hello"); //error—not an int
    intList.add(1); //ok
    intList.add(Foo.class); //error—not an int The above code creates an object intList of a specialized list type (e.g., List<int>). The attempt to add an element of String type would fail. The attempt to add an element of int type would succeed. The attempt to add an element of Class type would fail.

The unspecialized generic type (e.g., the raw List type) may interoperate with fully and properly specialized types (e.g., the List<int> type). This system fully tracks reified generic type instances (such as List<int>). The semantics of raw types are adjoined dynamically (in the core managed runtime) with the semantics of reified generic types.

Specifically, the system allows and encourages programmers to work with specialized types (e.g., the List<int> type) instead of unspecialized types (e.g., the raw List type). The type specializations may be propagated into data layouts and method calling sequences. However, the managed runtime also allows unspecialized types to co-exist along all paths that accept any specific instance.

Accordingly, wherever the List<int> type is allowed, the unspecialized List type is also allowed, but the specialized List<double> type is not allowed. Likewise, the unspecialized List type is also allowed wherever the specialized List<double> type is allowed, but the specialized List<int> type is not allowed.

Continuing with the above examples, consider the following code:

List unspecialL=intList;
    unspecialL.add(Foo.class);

The above code includes a mismatch in the type associated with the object being added and the type associated with the array. At compile time, a static compiler would not generate an error based on the above source code. The unspecialized List unspecialL is allowed to interoperate with the specialized List<int> intList. Further, the unspecialized List unspecialL may operate on a heterogenous list, including an element of a Class type. At runtime, however, a runtime environment may determine that there is an attempt to insert a Class object into a list that was only meant to contain int. As further discussed below, code that uses an unspecialized interface in ways that are incompatible with the dynamic type will yield to errors, as in the above example. But code that happens to use the unspecialized interface in the correct way will still work (perhaps without the optimizations available where there is a match in the specialized interface and the dynamic type).

4. Specialized and Unspecialized Types in Code and Heap

Figure 5:
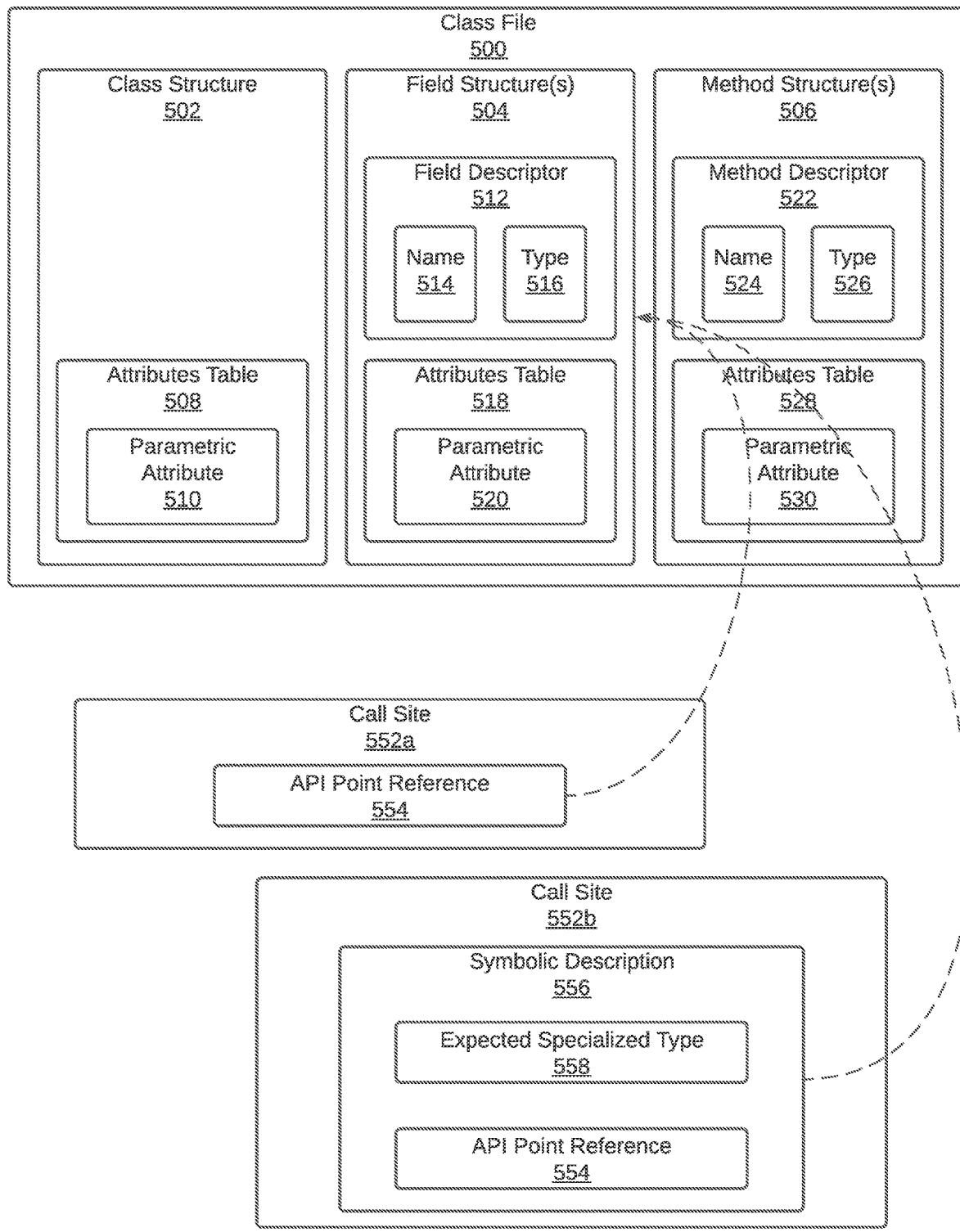
FIG. 5 illustrates an enhanced call site and unenhanced call site, in a set of compiled code, for an API point according to an embodiment.

FIG. 5 illustrates an enhanced call site and unenhanced call site, in a set of compiled code, for an API point according to an embodiment.

In one or more embodiments, a class file 500 for a type includes various information structures for different components of the type, including a class structure 502, one or more field structures 504, and one or more method structures 506. A class file 500 is similar to a class file 200 of FIG. 2. A class structure 502 is similar to a class structure 204 of FIG. 2. A field structure 504 is similar to a field structure 208 of FIG. 2. A method structure 506 is similar to a method structure 209 of FIG. 2.

In one or more embodiments, an information structure for an application programming interface (API) point is associated with a descriptor. The term "API point" as used herein refers to an interface, a class, a field, a method, and/or a constructor. As illustrated, a field structure 504 for a field in the type is associated with a descriptor 512; a method structure 506 for a method in the type is associated with a descriptor 522.

A descriptor for an API point indicates a name and type of the API point. As illustrated, descriptor 512 indicates name 514 and type 516 for field structure 504; descriptor 522 indicates name 524 and type 526 for method structure 506. A descriptor for a field indicates a name of the field and a type of the field. A type of a field may also be referred to specifically as a "field type." A descriptor for a method indicates a name of the method, and one or more types of a method return value, and zero or more method parameters.

In one or more embodiments, an information structure for an API point is associated with an attributes table. As illustrated, a class structure 502 for a type is associated with an attributes table 508; a field structure 504 for a field in the type is associated with an attributes table 518; a method structure 506 for a method in the type is associated with an attributes table 528. An attributes table (such as any of attributes tables 508, 518, 528) includes zero or more attributes associated with the corresponding API point.

In one or more embodiments, a parametric attribute (such as any of parametric attributes 510, 520, 530) is a kind of attribute that marks an API point as parametric and therefore specializable with respect to a particular context. If a parametric attribute is present in an information structure for an API point, then the API point is parametric. If no parametric attribute is present in an information structure for an API point, then the API point is invariant.

In one or more embodiments, a parametric API point may be called by an unenhanced call site 552a or an enhanced call site 552b. The call sites 552a-b may be located within the same class file 500, or one or more different class files.

An unenhanced call site 552a includes a call instruction (such as an instantiation instruction, an access instruction, or an invocation instruction) and an API point reference 554. An API point reference 554 points to the API point being called. An API point reference 554 may point to a class structure 502, a field structure 504, or a method structure 506.

An enhanced call site 552b includes a call instruction and a symbolic description 556. The symbolic description 556 indicates (a) an API point reference 554 pointing to an API point and (b) a reference to a specialized type 558 associated with the API point. The specialized type 558 is a parametric type specialized within a particular context. The parametric type being specialized may or may not be the API point being called. In an embodiment, where the API point being called is a parametric type, the specialized type 558 refers to a specialization of the API point itself; where the API point being called is a field or method within a parametric type, the specialized type 558 refers to a specialization of the parametric type, not the API point. The symbolic description 556 may be a constant (such as a dynamically computed constant) that indicates the specialized type 558 and the API point reference 554. The specialized type 558 may be referred to as an "expected specialized type 558" for the API point, or the type including the API point, specified by the call site 552b.

A symbolic description 556 may be seen as an optional "wrapper." The "wrapper" wraps around an API point reference 554 and a reference to a specialized type 558. The "wrapper" serves as a parameter to a call instruction.

The same parametric API point may be called directly, without using a symbolic description, from one call site and using a symbolic description from another call site. As illustrated, both call sites 552a-b call the same field represented by field structure 504. When an enhanced call site 552b is used, a specialized type 558 may indicate one or more type restrictions on the API point.

A field, when defined by a type, is associated with a field type. The field type may be indicated by a field descriptor for the field (e.g., field type 516 is indicated by field descriptor 512 for a field represented by field structure 504). The field, without any type restriction, may assume any value that is valid for the field type. However, a type restriction on the field restricts the field to assuming only a certain subset of values (or even no values at all). Based on the type restriction, values that would have been valid for the field type would be invalid for the field. As an example, a field type for a field may be Object. A type restriction on the field may restrict the field to values of int. Based on the type restriction, the field may only assume values of int, such as 1, 2, 3, 4. A value that would have been valid for the field type, such as a reference, would be invalid for the field.

Similarly, a method, when defined by a type, is associated with zero, one, or more parameter types and a return type. The parameter type(s) and/or return type may be indicated by a method descriptor for the method (e.g., type 526 including information for zero or more parameter types and a return type is indicated by method descriptor 522 for a method represented by method structure 506). A method parameter, without any type restriction, may assume any value that is valid for the corresponding parameter type. A return value, without any type restrictions, may assume any value that is valid for the return type. However, a type restriction on a parameter and/or return value restricts the parameter and/or return value to assuming only a certain subset of values (or even no values at all). Based on the type restriction, values that would have been valid for a parameter type would be invalid for the parameter. Additionally or alternatively, based on the type restriction, values that would have been valid for a return type would be invalid for the return value. As an example, a parameter type for a method parameter may be int. A type restriction on the field may restrict the field to even values of int. Based on the type restriction, the field may only assume even values of int, such as 2, 4, 6, 8. A value that would have been valid for the field type, such as 1, 3, 5, 7, would be invalid for the field.

Figure 6:
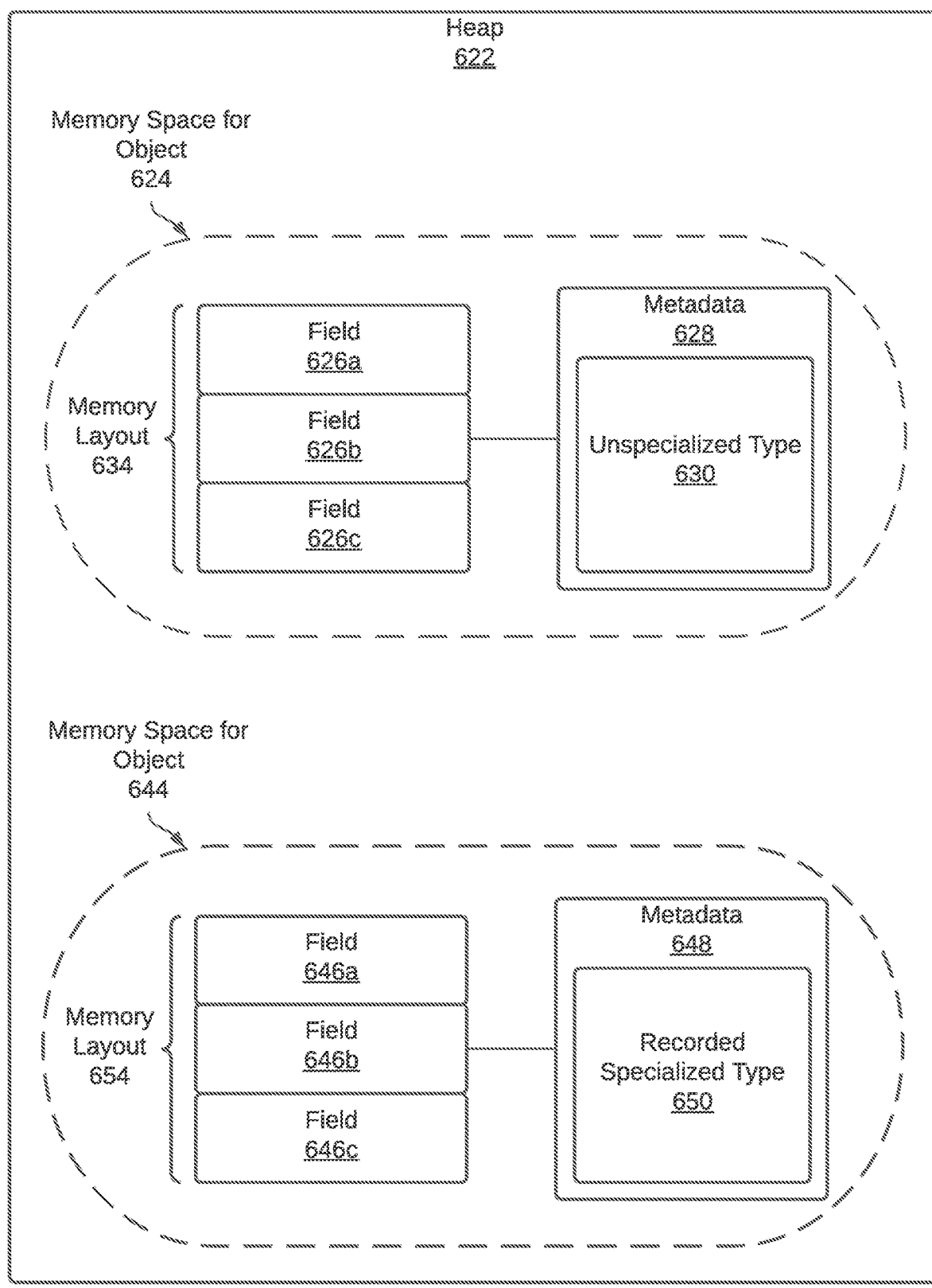
FIG. 6 illustrates an object of an unspecialized type and an object of a specialized type within a heap memory according to an embodiment.

FIG. 6 illustrates an object of an unspecialized type and an object of a specialized type within a heap memory according to an embodiment.

In one or more embodiments, a type (unspecialized or specialized) is associated with a memory layout. A memory layout defines a sequence of fields in the type, and a respective size of each field. Further, the type is associated with a memory size. The memory size includes a total size of all fields of the type.

In one or more embodiments, an unspecialized type 630 defines (or inherits) fields 626a-c. A specialized type 650 results from the unspecialized type 630 specialized within a particular context. The unspecialized 630 may be referred to as an "underlying unspecialized type" for the specialized type. In an embodiment, a memory layout 644 for the specialized type 650 may be same as or different from a memory layout 634 for the underlying unspecialized type 630. In particular, sizes of fields 626a-c of the unspecialized type 630 may be modified based on one or more type restrictions, or other information, derived from the specialized type 650 to produce fields 646a-c of the specialized type 650. Additionally or alternatively, a sequence of fields 626a-c may be modified based on one or more type restrictions, or other information, derived from the specialized type 650 to produce fields 646a-c. Given a modified memory layout 654, the specialized type 650 may be associated with a different memory size than the underlying unspecialized type 630.

In one or more embodiments, an object of a particular type (unspecialized or specialized) is stored within a heap 622 in accordance with a memory layout and/or memory size associated with the particular type. As illustrated, for example, an object of a unspecialized type 630 occupies a memory space 624 within a heap 622. The object is associated with a memory layout 634 of the unspecialized type 630. The memory layout 634 provides how fields 626a-c are stored within the memory space 624. The object is associated with a memory size of the unspecialized type 630. Further, an object of a specialized type 650 occupies a memory space 644 within the heap 622. The object is associated with a memory layout 654 of the specialized type 650. The memory layout 654 provides how fields 646a-c are stored within the memory space 644. The object is associated with a memory size of the specialized type 650.

In one or more embodiments, an object of a particular type (unspecialized or specialized) is stored within a heap 622 in association with the particular type. The association with the particular type may be indicated, for example, using a reference to an object (such as a class mirror) representing the particular type. As illustrated, for example, an object of a unspecialized type 630 is associated with metadata 628. The metadata 628 may be stored, for example, in a header of the object. The metadata 628 indicates the unspecialized type 630 for the object. Further, an object of a specialized type 650 is associated with metadata 648. The metadata 648 may be stored, for example, in a header of the object. The metadata 648 indicates a specialized type 650 for the object. The specialized type 650 stored in association with the object may be referred to as a "recorded specialized type" for the object.

5. Compiling Access to Specialized and Unspecialized Types

Figure 7:
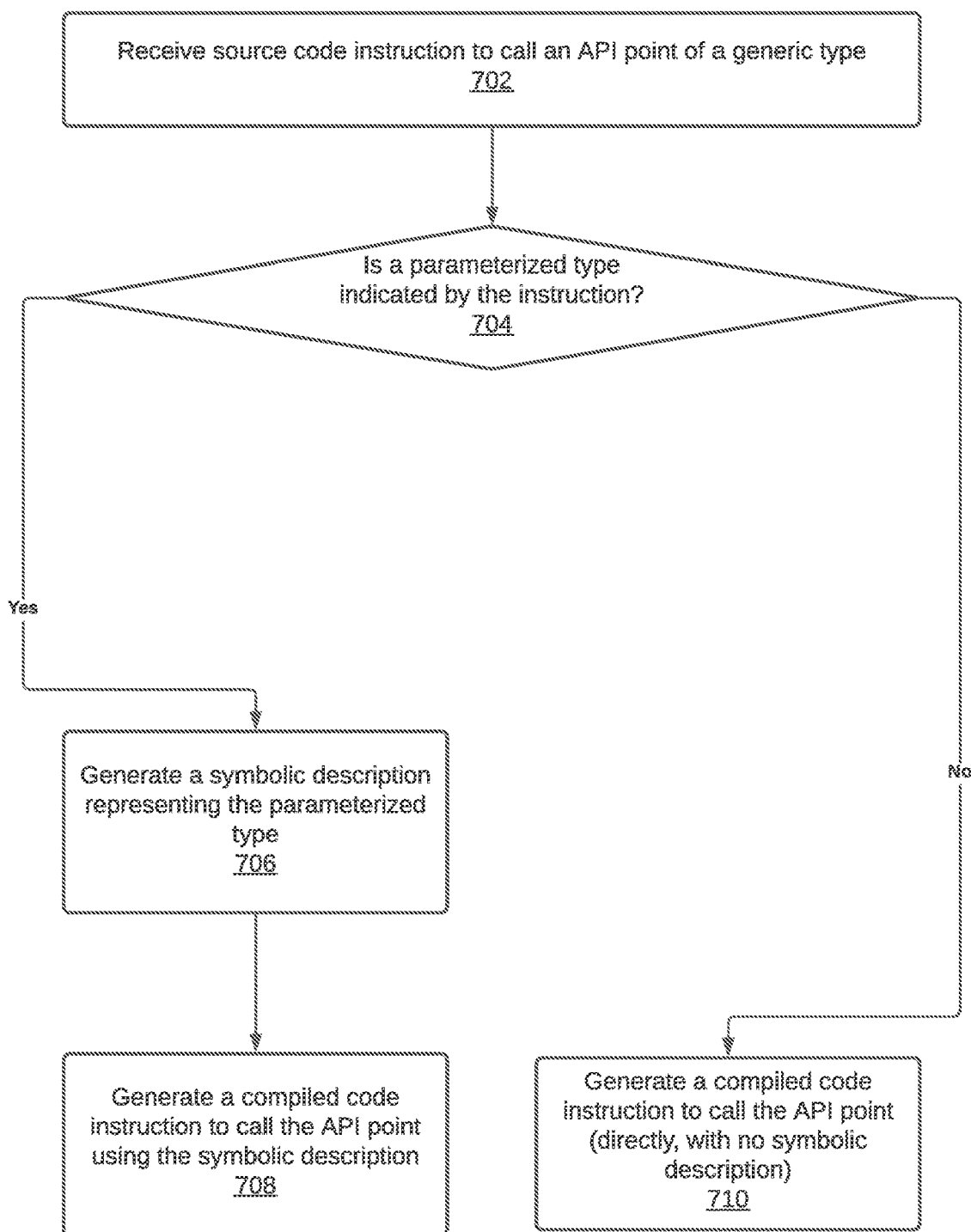
FIG. 7 illustrates an example set of operations for compiling access to specialized and unspecialized types according to an embodiment.

FIG. 7 illustrates an example set of operations for compiling access to specialized and unspecialized types according to an embodiment. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include receiving a source code instruction to call an API point of a generic type (Operation 702). A compiler receives a set of source code, including a source code instruction to call an API point. If the API point is a type, the compiler identifies the type and loads the type. If the API point is a field or method, the compiler identifies a type including the field or method, and loads the type. The compiler determines that the type associated with the API point is a generic type.

An example set of code may be:

```
Box<T> {
    static T sfd ;
    T fd;
    T mtd( ) { return fd; }
}
```

-continued

```
public static void main(String[ ] args) {
    Box<Integer> my = new Box<Integer>( );
    Integer fd1 = Box<Integer>.sfd;
    Integer fd2 = my.fd;
    Integer result = my.mtd( );
    Box myraw = new Box( );
    Integer fd1raw = Box.sfd;
    Integer fd2raw = myraw.fd;
    Integer resultraw = myraw.mtd( );
    return;
}
```

In the above example code, Box<T> is a generic type. The type name is Box. The angle brackets < > denote a type parameter section, specifying a list of one or more type parameters, such as T.

Further, various API points associated with the generic class Box<T> are called. In the line Box<Integer> my=new Box<Integer>( ); the API point being called is a class. In the line Integer fd1=Box<Integer>.sfd; the API point being called is a static field. In the line Integer fd2=my.fd; the API point being called is a field. In the line Integer result=my.mtd( ); the API point being called is a method.

Similarly, in the line Box myraw=new Box ( ); the API point being called is a class. In the line Integer fd1raw=Box.sfd; the API point being called is a static field. In the line Integer fd2raw=myraw.fd; the API point being called is a field. In the line Integer resultraw=myraw.mtd ( ); the API point being called is a method.

One or more embodiments include determining whether the source code instruction indicates a parameterized type (Operation 704). The compiler determines whether the source code instruction indicates a parameterized type.

In an embodiment, a source code instruction may explicitly specify a parameterized type. Examples of such source code instructions include Box<Integer> my=new Box<Integer> ( ); and Integer fd1=Box<Integer> .sfd; The compiler determines the parameterized type based on the source code instruction itself. Here, the parameterized type is Box<Integer>.

In an embodiment, a source code instruction may specify an object that was generated using a parameterized type. Examples of such source code instructions include Integer fd2=my.fd; and Integer result=my.mtd ( ); where my was instantiated using Box<Integer> my=new Box<Integer> ( ); The compiler determines the parameterized type based on the object. Here, the parameterized type of the object is Box<Integer>.

In an embodiment, a source code instruction does not indicate any parameterized type. Referring to the above example code, the instructions relating to myraw do not explicitly specify any parameterized type. Further, the instructions relating to myraw do not specify an object that was generated using a parameterized type, since myraw was generated using the generic type without any specialization. The type of myraw may be referred to as a "raw type."

If the source code instruction indicates a parameterized type, one or more embodiments include generating a symbolic description representing the parameterized type (Operation 706). The compiler generates a symbolic description representing the parameterized type.

In an embodiment, the compiler generates a dynamically resolved constant. At runtime, the dynamically resolved constant resolves into a value representing the parameterized type.

One or more embodiments include generating a compiled code instruction to call the API point using the symbolic description (Operation 708). The compiler converts the source code instruction into a compiled code instruction. The parameter to the compiled code instruction is the symbolic description, which references (a) the value representing the parameterized type, and (b) the API point being called. An example of such a compiled code instruction is call site 552*b* of FIG. 5.

If the source code instruction does not indicate a parameterized type, one or more embodiments include generating a compiled code instruction to call the API point (Operation 710). The compiler converts the source code instruction into a compiled code instruction. The parameter to the compiled code instruction is a reference to the API point being called. The compiled code instruction is not associated with any symbolic description representing any parameterized type. An example of such a compiled code instruction is call site 552*a* of FIG. 5.

Based on the operations of FIG. 7, a compiler is configured to compile both source code instruction operating on a parameterized version of a generic type and source code instruction operating on a raw version of the generic type.

6. Using Specialized and Unspecialized Types

Figure 8:
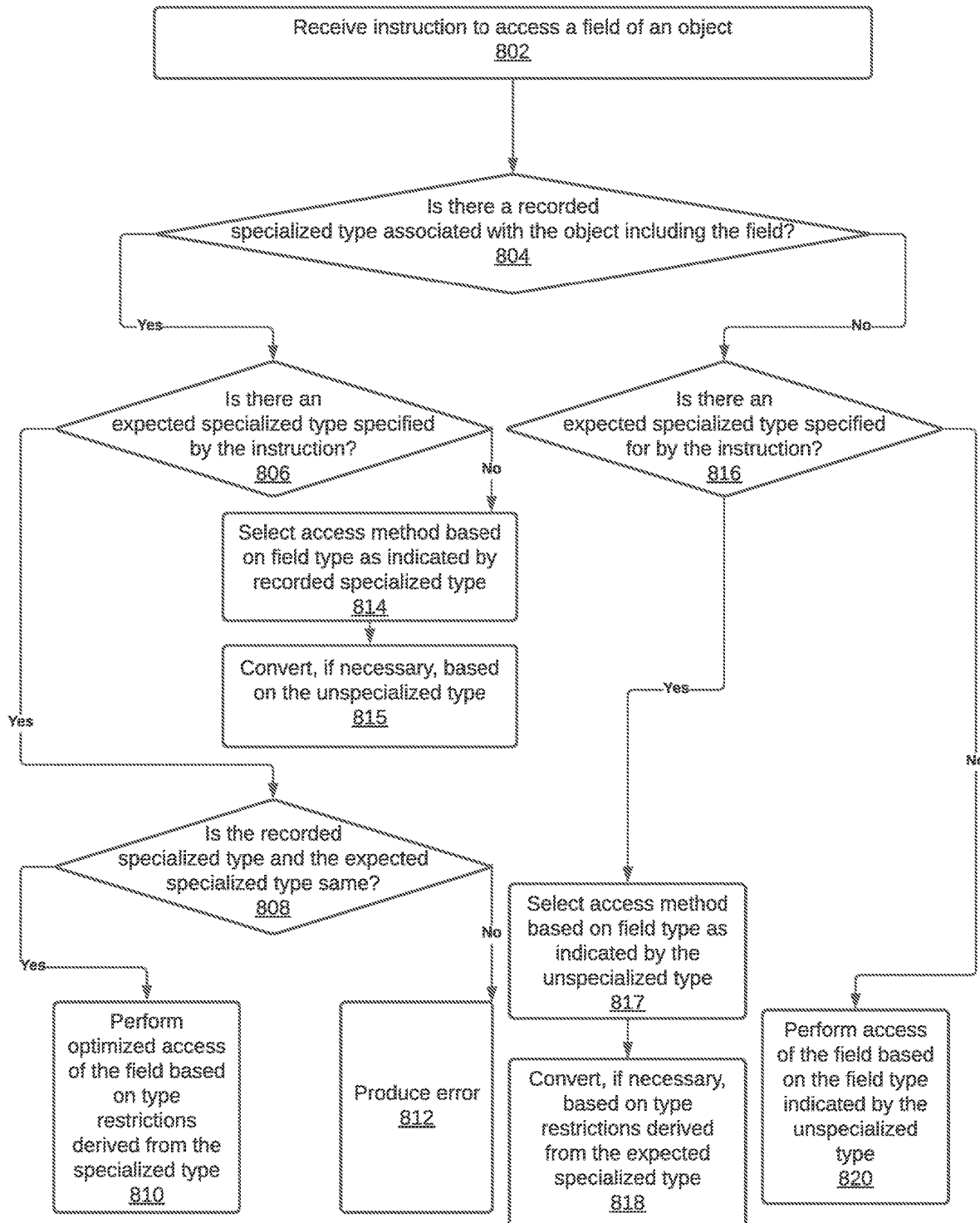
FIG. 8 illustrates an example set of operations for executing an access to a field of an object of a specialized type and executing an access to a field of an object of an unspecialized type according to an embodiment.

FIG. 8 illustrates an example set of operations for executing an access to a field of an object of a specialized type and executing an access to a field of an object of an unspecialized type according to an embodiment. One or more operations illustrated in FIG. 8 may be modified, rearranged, or omitted all together. Accordingly, the particular sequence of operations illustrated in FIG. 8 should not be construed as limiting the scope of one or more embodiments.

One or more embodiments including receiving an instruction to access a field of an object (Operation 802). A runtime environment receives an instruction to access a field of an object. The instruction may be a compiled code instruction to access a field, for example, a getfield instruction (for reading a value from the field), a putfield instruction (for writing a value to the field), or an invokevirtual instruction (for passing a value from a field as a method parameter and/or returning a value from a method to the field). The access instruction may include an identifier of a type including the field (e.g., a class name, or an interface name). The type including the field is an unspecialized type and is also the type of the object including the field. In some embodiments, the access instruction may further include (a) an identifier of the field to be accessed (e.g., a field name), and/or (b) a type of the field.

One or more embodiments include determining whether the object including the field is associated with a recorded specialized type (Operation 804). The runtime environment obtains metadata associated with the object including the field. The metadata indicates a type recorded in association with the object. The runtime environment determines whether the type recorded in association with the object is a specialized type.

In an embodiment, the metadata associated with the object includes a reference to an object, such as a class mirror, representing the type of the object. The runtime environment looks up the class mirror representing the type. If the class mirror represents a specialized type, then the runtime environment determines that the object including the field is associated with a recorded specialized type. If the class mirror does not represent a specialized type (for example, the class mirror represents an unspecialized type), then the runtime environment determines that the object including the field is not associated with a recorded specialized type.

One or more embodiments include determining whether the access instruction indicates an expected specialized type of the object (Operation 806 or Operation 816). The access instruction, when compiled, may have included an indication of an expected specialized type of the object including the field to be accessed. The runtime environment determines whether the access instruction received at Operation 802 in fact includes an expected specialized type.

In an embodiment, the access instruction received at Operation 802 specifies a symbolic description. The symbolic description indicates (a) a reference to an expected specialized type and (b) a reference to the field to be accessed. Based on the symbolic description specified by the access instruction, the runtime environment determines that the access instruction does specify an expected specialized type. In another embodiment, the access instruction received at Operation 802 may specify a different kind of information that represents an expected specialized type. Based on the information specified by the access instruction, the runtime environment determines that the access instruction does specify an expected specialized type. If no symbolic description, or no information representing any expected specialized type, is specified by the access instruction, the runtime environment determines that the access instruction does not specify an expected specialized type.

If the object has a recorded specialized type (YES in Operation 804) and the access instruction has an expected specialized type (YES in Operation 806), one or more embodiments include determining whether the recorded specialized type and the expected specialized type are same (Operation 808). The runtime environment compares the recorded specialized type and the expected specialized type to determine whether the two types are the same.

If the recorded specialized type and the expected specialized type are the same (YES in Operation 808), one or more embodiments include performing an optimized access of the field based on type restrictions derived from the specialized type (Operation 810). The runtime environment determines whether the specialized type (either the recorded specialized type, or the expected specialized type, which are the same) indicates any type restrictions for the field. The runtime environment may perform an optimized access of the field based on the type restrictions. For example, a runtime environment may determine that a data value conforming with the type restriction is directly accessible, and thereby perform a direct access to the field. Examples of data types that are directly accessible include primitive types (such as boolean, int, double) or any non-polymorphic type.

As an example, a class may define a field and may specify that a field type for the field is Object. A runtime environment may receive an access instruction to access the field of a object. The object and the access instruction may be associated with the same specialized type. The specialized type may indicate a type restriction on the field, restricting the field to values of int. Therefore, without the specialization information, the runtime environment would have had to perform an indirect access to the field—the runtime environment would obtain a reference associated with the field, and identify a space within heap based on the reference; the identified space corresponds to the data value for the field. However, with the specialization information, the runtime environment may now perform a direct access to the field—the runtime environment may directly access the int value for the field, without going through a reference associated with the field.

If the recorded specialized type and the expected specialized type are not the same (NO in Operation 808), one or more embodiments include producing an error (Operation 812). For example, the runtime environment may produce a class cast exception, a type mismatch error, or other similar error types.

If the object has a recorded specialized type (YES in Operation 804) and the access instruction does not have an expected specialized type (NO in Operation 806), one or more embodiments include selecting an access method based on the field type as indicated by the recorded specialized type (Operation 814). The runtime environment determines the field type of the field as indicated by the recorded specialized type of the object. The field type of the field as indicated by the recorded specialized type may include a type restriction enforced by the recorded specialized type. Based on the field type of the field as indicated by the recorded specialized type, the runtime environment determines an access method suitable for the field type. The runtime environment selects direct access where possible, and otherwise selects indirect access. As an example, direct access is possible for primitive types and non-polymorphic types, such as int, double, and char; direct access is not possible for any reference types, such as Object, and Integer. The runtime environment uses the selected access method to access the field. The runtime environment may use the selected access method to read from the field and/or write to the field.

One or more embodiments include converting the data value for the field, if necessary, based on the unspecialized type (Operation 815). The runtime environment determines a field type of the field as indicated by the unspecialized type of the object. The field type of the field as indicated by the unspecialized type may be indicated by a field descriptor of the field. The field descriptor may be specified in a class file of the unspecialized type. Based on the field type as indicated by the unspecialized type, the runtime method determines an access method suitable for the field. The runtime environment selects direct access where possible, and otherwise selects indirect access. As an example, direct access is possible for primitive types and non-polymorphic types, such as int, double, and char; direct access is not possible for any reference types, such as Object, and Integer.

The runtime environment compares the access method selected based on the unspecialized type and the access method selected based on the recorded specialized type at Operation 814. If the access method selected based on the unspecialized type is indirect, and the access method selected based on the recorded specialized type is direct, then boxing or unboxing is performed.

If the access instruction is a read instruction, the runtime environment uses direct access to obtain the data value for the field, and then stores the data value to a memory location on the heap, and returns a reference to the memory location. The data value is thereby "boxed" from a primitive type into an Object type (or other reference type).

If the access instruction is a write instruction, the runtime environment obtains a reference indicating a memory location on the heap from the write instruction. The runtime environment obtains a data value from the memory location. The runtime environment performs a direct access to write the data value to the field. The data value is thereby "unboxed" from an Object type (or other reference type) into a primitive type.

As an example, a class may define a field and may specify that a field type for the field is Object. A runtime environment may receive an access instruction to the field of an object. The object may be associated with a recorded specialized type. The recorded specialized type may indicate that a type restriction restricts the field to assuming values of int. Meanwhile, the access instruction does not indicate any specialized type. The runtime environment determines that direct access is possible for a field type of the field based on the recorded specialized type (the field type is int). The runtime environment determines that direct access is not possible for a field type of the field based on the unspecialized type of the object (the field type is Object). Therefore, the runtime environment directly accesses the int value for the field, and performs a boxing operation to convert the int value into an Object value. A reference to the Object value (stored on heap) is returned.

If conversion is necessary but not possible, then the runtime environment generates an error.

If the object does not have a recorded specialized type (NO in Operation 804) and the access instruction has an expected specialized type (YES in Operation 816), one or more embodiments include selecting an access method based on a field type of the field as indicated by the unspecialized type of the object (Operation 817). The runtime environment determines a field type of the field as indicated by the unspecialized type of the object. The field type of the field as indicated by the unspecialized type may be indicated by a field descriptor of the field. The field descriptor may be specified in a class file of the unspecialized type. Based on the field type as indicated by the unspecialized type, the runtime method determines an access method suitable for the field. The runtime environment selects direct access where possible, and otherwise selects indirect access. As an example, direct access is possible for primitive types and non-polymorphic types, such as int, double, and char; direct access is not possible for any reference types, such as Object, and Integer. The runtime environment uses the selected access method to access the field. The runtime environment may use the selected access method to read from the field and/or write to the field.

One or more embodiments include converting the data value for the field, if necessary, based on type restrictions derived from the expected specialized type (Operation 818). The runtime environment determines the field type of the field as indicated by the expected specialized type specified for the access instruction. The field type of the field as indicated by the expected specialized type may include a type restriction enforced by the expected specialized type. Based on the field type of the field as indicated by the expected specialized type, the runtime environment determines an access method suitable for the field type. The runtime environment selects direct access where possible, and otherwise selects indirect access. As an example, direct access is possible for primitive types and non-polymorphic types, such as int, double, and char; direct access is not possible for any reference types, such as Object, and Integer.

The runtime environment compares the access method selected based on the unspecialized type at Operation 817 and the access method selected based on the expected specialized type. If the access method selected based on the unspecialized type is indirect, and the access method selected based on the expected specialized type is direct, then boxing or unboxing is performed.

If the access instruction is a read instruction, the runtime environment uses indirect access to obtain the data value for the field—the runtime environment obtains a reference to a memory location in heap and reads the data value from the memory location. The runtime environment then directly returns the data value read from the memory location, rather than returning the reference to the memory location. The data value is thereby "unboxed" from an Object type (or other reference type) to a primitive type.

If the access instruction is a write instruction, the runtime environment obtains the data value to be written from the write instruction. The runtime environment obtains a reference to a memory location in heap corresponding to the field. The runtime environment stores the data value to be written into the referenced memory location, thereby performing an indirect access. The data value is thereby "boxed" from a primitive type into an Object type (or other reference type).

As an example, a class may define a field and may specify that a field type for the field is Object. A runtime environment may receive an access instruction to the field of an object. The object is not associated with any specialized type. Meanwhile, the access instruction does indicate an expected specialized type. The expected specialized type may indicate that a type restriction restricts the field to assuming values of int. The runtime environment determines that direct access is not possible for a field type of the field based on the unspecialized type of the object (the field type is Object). The runtime environment determines that direct access is possible for a field type of the field based on the expected specialized type indicated by the access instruction (the field type is int). Therefore, the runtime environment performs an indirect access to obtain the Object value for the field, and performs an unboxing operation to convert the Object value into an int value. The int value is directly returned.

If conversion is necessary but not possible, then the runtime environment generates an error. Reusing the example above, the runtime environment performs an indirect access to obtain the Object value for the field, and attempts to perform an unboxing operation to convert the Object value into an int value. The data value of the Object may be "1.4." The data value "1.4" is not convertible into an int value without loss of information. Therefore the runtime environment may generate an error.

If the object does not have a recorded specialized type (NO in Operation 804) and the access instruction does not have an expected specialized type (NO in Operation 816), one or more embodiments include performing access of the field based on the field type of the field as indicated by the unspecialized type of the object (Operation 820). The runtime environment determines the field type of the field as indicated by the unspecialized type of the object. The runtime environment may, for example, identify the field type from a field descriptor for the field. The runtime environment determines an access method suitable for the field type. The runtime environment uses the access method to access the field.

Figure 9:
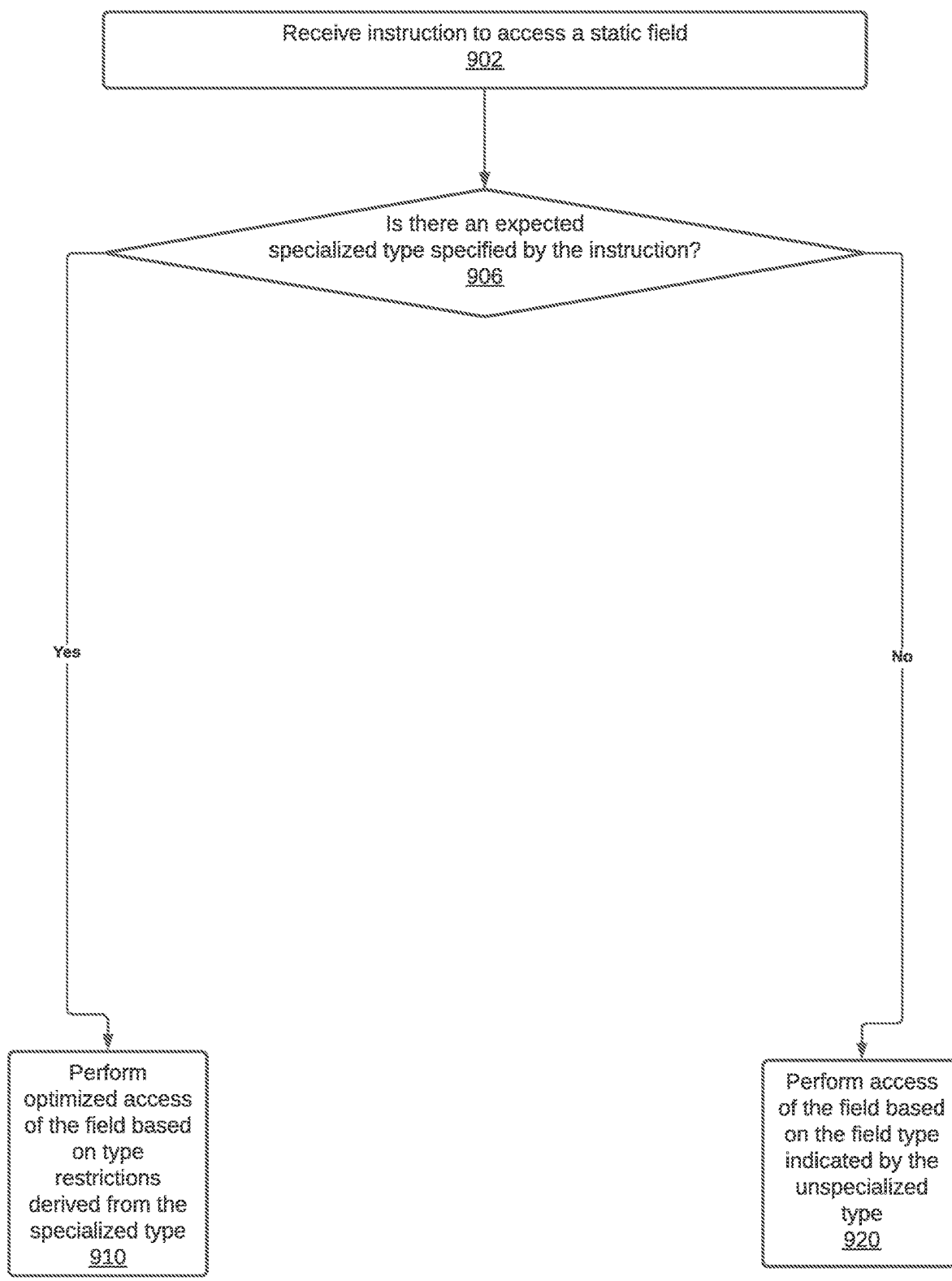
FIG. 9 illustrates an example set of operations for executing an access to a static field included in a specialized type and executing an access to a static field included in an unspecialized type according to an embodiment.

FIG. 9 illustrates an example set of operations for executing an access to a static field included in a specialized type and executing an access to a static field included in an unspecialized type according to an embodiment. One or more operations illustrated in FIG. 9 may be modified, rearranged, or omitted all together. Accordingly, the particular sequence of operations illustrated in FIG. 9 should not be construed as limiting the scope of one or more embodiments.

One or more embodiments including receiving an instruction to access a static field (Operation 902). A runtime environment receives an instruction to access a static field. The instruction may be a compiled code instruction to access a field, for example, a getfield instruction (for reading a value from the field), a putfield instruction (for writing a value to the field), or an invokevirtual instruction (for passing a value from a field as a method parameter and/or returning a value from a method to the field). The access instruction may include an identifier of a type including the field (e.g., a class name, or an interface name). The type including the field is an unspecialized type. In some embodiments, the access instruction may further include (a) an identifier of the field to be accessed (e.g., a field name), and/or (b) a type of the field.

One or more embodiments include determining whether the access instruction indicates an expected specialized type that includes the static field (Operation 906). The access instruction, when compiled, may have included an indication of an expected specialized type that includes the static field to be accessed. The runtime environment determines whether the access instruction received at Operation 902 in fact includes an expected specialized type. Examples of operations for determining whether an instruction includes an expected specialized type are described above with reference to Operation 806 or Operation 816.

If the access instruction has an expected specialized type (YES in Operation 906), one or more embodiments include performing an optimized access of the static field based on type restrictions derived from the specialized type (Operation 910). The runtime environment determines whether the expected specialized type indicates any type restrictions for the static field. The runtime environment may perform an optimized access of the static field based on the type restrictions. The optimized access may involve a direct access that would not have been possible without the type restriction. Examples of operations for performing an optimized access based on type restrictions are described above with reference to Operation 810.

If the access instruction does not have an expected specialized type (NO in Operation 906), one or more embodiments include performing access of the static field based on the field type of the static field as indicated by the containing unspecialized type (Operation 920). The runtime environment determines the field type of the static field as indicated by the containing unspecialized type. The runtime environment may, for example, identify the field type from a field descriptor for the field. The runtime environment determines an access method suitable for the field type. The runtime environment uses the access method to access the field.

Figure 10:
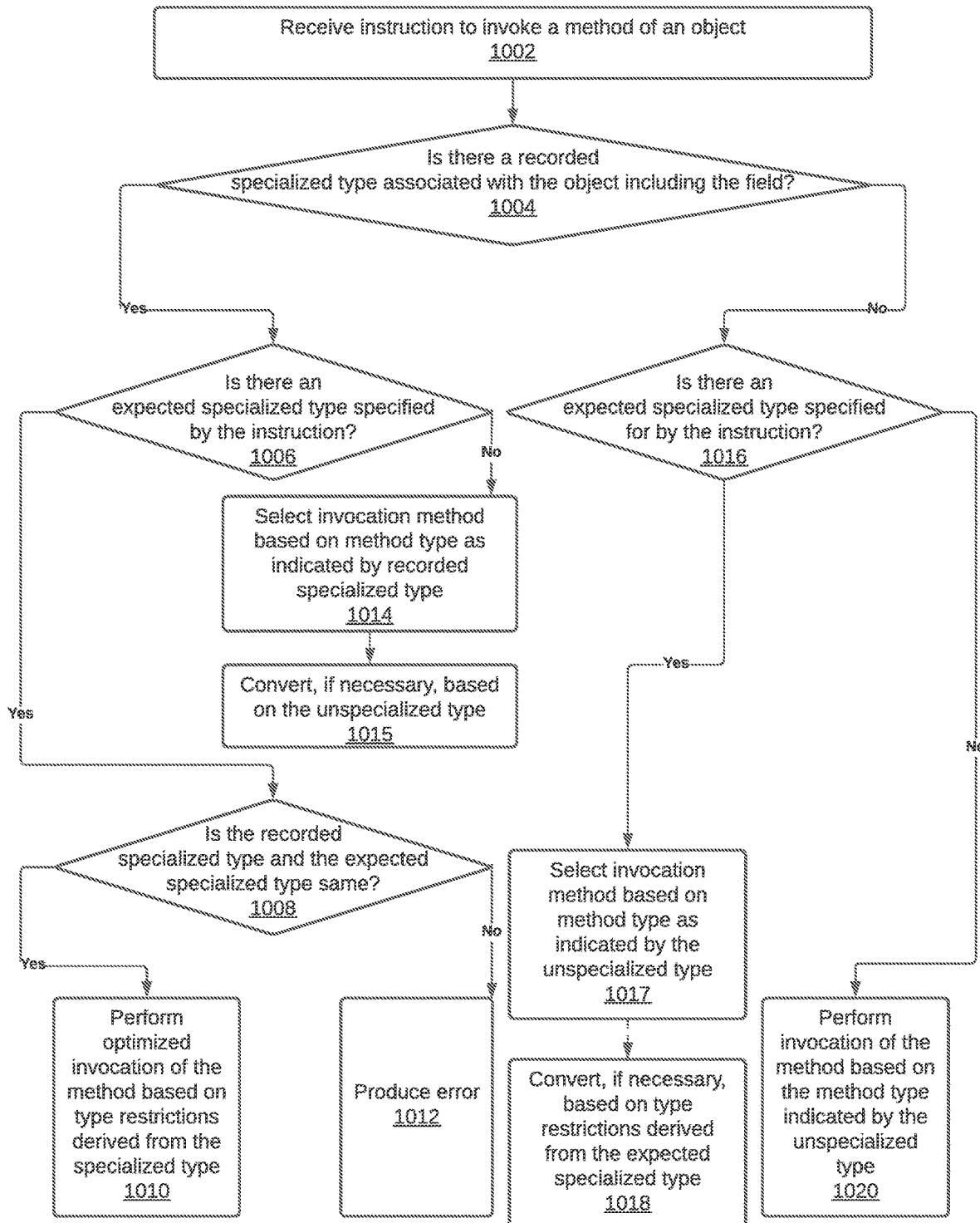
FIG. 10 illustrates an example set of operations for executing a method of an object of a specialized type and executing a method of an object of an unspecialized type according to an embodiment.

FIG. 10 illustrates an example set of operations for executing a method of an object of a specialized type and executing a method of an object of an unspecialized type according to an embodiment. One or more operations illustrated in FIG. 10 may be modified, rearranged, or omitted all together. Accordingly, the particular sequence of operations illustrated in FIG. 10 should not be construed as limiting the scope of one or more embodiments.

One or more embodiments including receiving an instruction to invoke a method of an object (Operation 1002). A runtime environment receives an instruction to invoke a method of an object. The instruction may be a compiled code instruction to invoke a method. The invocation instruction may include an identifier of a type including the method (e.g., a class name, or an interface name). The type including the method is an unspecialized type and is also the type of the object whose method is invoked. In some embodiments, the invocation instruction may further include (a) an identifier of the method to be invoked (e.g., a method name), and/or (b) a method type of the method, which indicates zero or more parameter types and a return type of the method.

One or more embodiments include determining whether the object whose method is invoked is associated with a recorded specialized type (Operation 1004). The runtime environment obtains metadata associated with the object whose method is invoked. The metadata indicates a type recorded in association with the object. The runtime environment determines whether the type recorded in association with the object is a specialized type. Examples of operations for determining whether the object is associated with a recorded specialized type are described above with reference to Operation 804.

One or more embodiments include determining whether the invocation instruction indicates an expected specialized type of the object (Operation 1006 or Operation 1016). The invocation instruction, when compiled, may have included an indication of an expected specialized type of the object whose method is invoked. The runtime environment determines whether the invocation instruction received at Operation 1002 in fact includes an expected specialized type. Examples of operations for determining whether an instruction includes an expected specialized type are described above with reference to Operation 806 or Operation 816.

If the object has a recorded specialized type (YES in Operation 1004) and the invocation instruction has an expected specialized type (YES in Operation 1006), one or more embodiments include determining whether the recorded specialized type and the expected specialized type are same (Operation 1008). The runtime environment compares the recorded specialized type and the expected specialized type to determine whether the two types are the same.

If the recorded specialized type and the expected specialized type are the same (YES in Operation 1008), one or more embodiments include performing an optimized invocation of the method based on type restrictions derived from the specialized type (Operation 1010). The runtime environment determines whether the specialized type (either the recorded specialized type, or the expected specialized type, which are the same) indicates any type restrictions for the method parameters and/or return value. The runtime environment may perform an optimized (e.g., direct) access of the method parameters and/or return value based on the type restrictions, which results in an optimized invocation of the method.

As an example, a class may define a method and may specify that a parameter type for a method parameter is Object. A runtime environment may receive an invocation instruction to invoke the method of an object. The object and the invocation instruction may be associated with the same specialized type. The specialized type may indicate a type restriction on the method parameter, restricting the method parameter to values of int. Therefore, without the specialization information, the runtime environment would have had to perform an indirect access to the method parameter—the runtime environment would obtain a reference associated with the method parameter, and identify a space within heap based on the reference; the identified space corresponds to the data value for the method parameter. However, with the specialization information, the runtime environment may now perform a direct access to the method parameter—the runtime environment may directly obtain the int value for the method parameter from an operand stack, or a local variable within a call frame, without going through a reference associated with the method parameter.

If the recorded specialized type and the expected specialized type are not the same (NO in Operation 1008), one or more embodiments include producing an error (Operation 1012). For example, the runtime environment may produce a class cast exception, a type mismatch error, or other similar error types.

If the object has a recorded specialized type (YES in Operation 1004) and the invocation instruction does not have an expected specialized type (NO in Operation 1006), one or more embodiments include selecting invocation method based on the method type as indicated by the recorded specialized type (Operation 1014). The runtime environment determines the method type of the method as indicated by the recorded specialized type of the object. The method type of the method as indicated by the recorded specialized type may include a type restriction on a method parameter and/or return value enforced by the recorded specialized type. Based on the method type of the method as indicated by the recorded specialized type, the runtime environment determines an invocation method suitable for the method type. The runtime environment selects direct access of a method parameter and/or return value where possible, and otherwise selects indirect access. As an example, direct access is possible for primitive types and non-polymorphic types, such as int, double, and char; direct access is not possible for any reference types, such as Object, and Integer. The runtime environment uses the access method selected for each method parameter and/or return value to access the respective method parameter and/or return value, and thereby invokes the method.

One or more include converting the data value for the method parameter and/or return value, if necessary, based on the unspecialized type (Operation 1015). The runtime environment determines a method type of the method as indicated by the unspecialized type of the object. The method type of the method as indicated by the unspecialized type may be indicated by a method descriptor of the method. The method descriptor may be specified in a class file of the unspecialized type. Based on the method type as indicated by the unspecialized type, the runtime method determines an invocation method suitable for the method. The runtime environment selects direct access of a method parameter and/or return value where possible, and otherwise selects indirect access. As an example, direct access is possible for primitive types and non-polymorphic types, such as int, double, and char; direct access is not possible for any reference types, such as Object, and Integer.

The runtime environment compares the access method selected for a particular method parameter based on the unspecialized type and the access method selected for the particular method parameter based on the recorded specialized type at Operation 1014. If the access method selected based on the unspecialized type is indirect, and the access method selected based on the recorded specialized type is direct, then unboxing is performed for the particular method parameter. The runtime environment iterates the above process for each method parameter.

Additionally or alternatively, the runtime environment compares the access method selected for a method return value based on the unspecialized type and the access method selected for the method return value based on the recorded specialized type at Operation 814. If the access method selected based on the unspecialized type is indirect, and the access method selected based on the recorded specialized type is direct, then boxing is performed.

If conversion is necessary but not possible, then the runtime environment generates an error.

If the object does not have a recorded specialized type (NO in Operation 1004) and the invocation instruction has an expected specialized type (YES in Operation 1016), one or more embodiments include selecting an invocation method based on a method type of the method as indicated by the unspecialized type of the object (Operation 1017). The runtime environment determines a method type of the method as indicated by the unspecialized type of the object. The method type of the method as indicated by the unspecialized type may be indicated by a method descriptor of the method. The method descriptor may be specified in a class file of the unspecialized type. Based on the method type as indicated by the unspecialized type, the runtime method determines an invocation method suitable for the method. The runtime environment selects direct access of a method parameter and/or return value where possible, and otherwise selects indirect access. As an example, direct access is possible for primitive types and non-polymorphic types, such as int, double, and char; direct access is not possible for any reference types, such as Object, and Integer. The runtime environment uses the access method selected for each method parameter and/or return value to access the respective method parameter and/or return value, and thereby invokes the method.

One or more embodiments include converting the data value for the method parameter and/or return value, if necessary, based on type restrictions derived from the expected specialized type (Operation 1018). The runtime environment determines the method type of the method as indicated by the expected specialized type specified for the invocation instruction. The method type of the method as indicated by the expected specialized type may include a type restriction enforced by the expected specialized type. Based on the method type of the method as indicated by the expected specialized type, the runtime environment determines an invocation method suitable for the method type. The runtime environment selects direct access of a method parameter and/or return value where possible, and otherwise selects indirect access. As an example, direct access is possible for primitive types and non-polymorphic types, such as int, double, and char; direct access is not possible for any reference types, such as Object, and Integer.

The runtime environment compares the access method selected for a particular method parameter based on the unspecialized type at Operation 1017 and the access method selected for the particular method parameter based on the expected specialized type. If the access method selected based on the unspecialized type is indirect, and the access method selected based on the expected specialized type is direct, then boxing is performed for the particular method parameter. The runtime environment iterates the above process for each method parameter.

Additionally or alternatively, the runtime environment compares the access method selected for a method return value based on the unspecialized type at Operation 1017 and the access method selected for the method return value based on the expected specialized type. If the access method selected based on the unspecialized type is indirect, and the access method selected based on the expected specialized type is direct, then unboxing is performed.

If conversion is necessary but not possible, then the runtime environment generates an error.

If the object does not have a recorded specialized type (NO in Operation 1004) and the invocation instruction does not have an expected specialized type (NO in Operation 1016), one or more embodiments include performing invocation of the method based on the method type of the method as indicated by the unspecialized type of the object (Operation 1020). The runtime environment determines the method type of the method as indicated by the unspecialized type of the object. The runtime environment may, for example, identify the method type from a method descriptor for the method. The runtime environment determines an access method suitable for the parameter types and/or return type. The runtime environment uses the access method to access the method parameters and/or return value.

Figure 11:
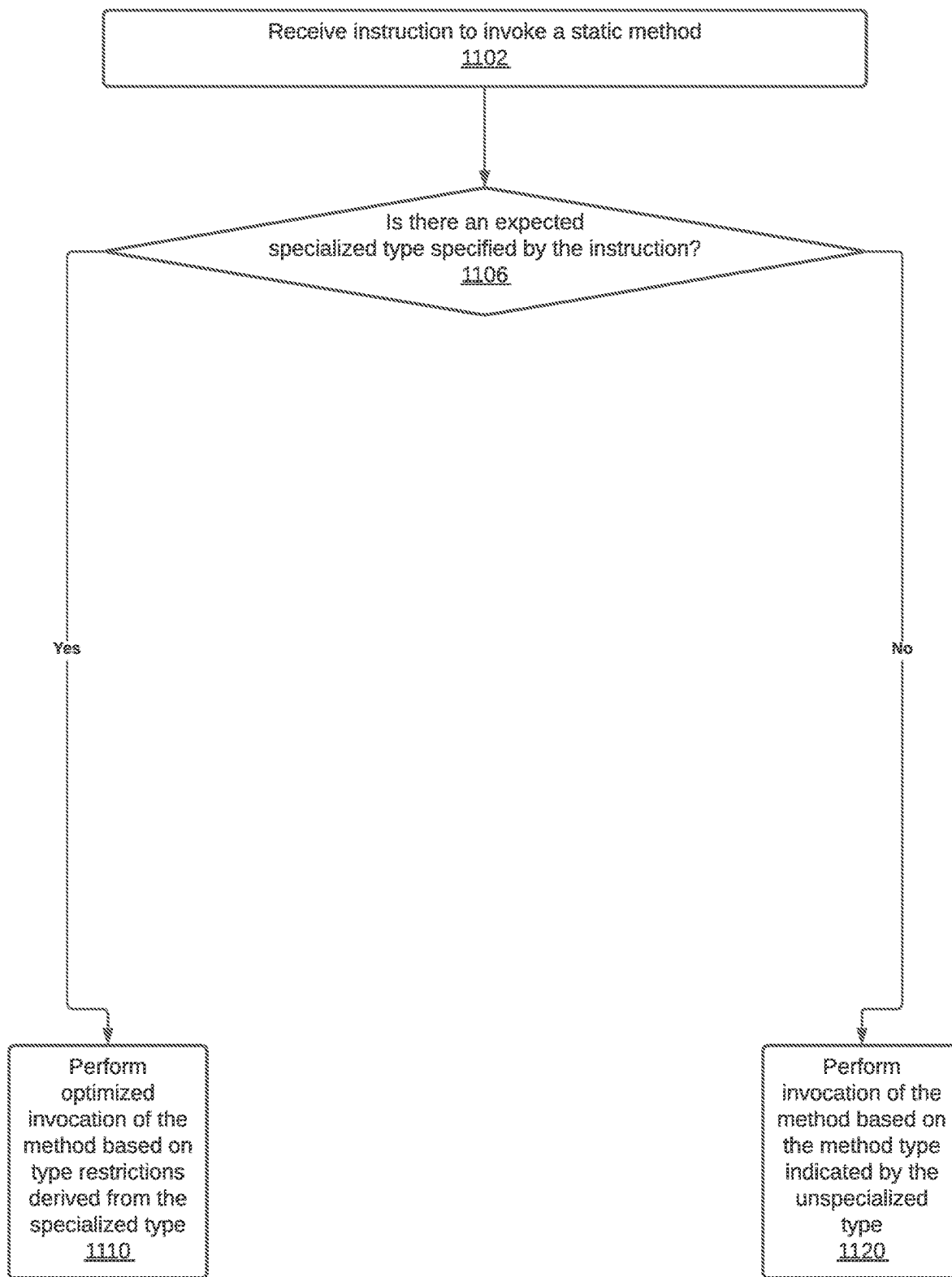
FIG. 11 illustrates an example set of operations for executing a static method included in a specialized type and executing a static method included in an unspecialized type according to an embodiment.

FIG. 11 illustrates an example set of operations for executing a static method included in a specialized type and executing a static method included in an unspecialized type according to an embodiment. One or more operations illustrated in FIG. 11 may be modified, rearranged, or omitted all together. Accordingly, the particular sequence of operations illustrated in FIG. 11 should not be construed as limiting the scope of one or more embodiments.

One or more embodiments including receiving an instruction to invoke a static method (Operation 1102). A runtime environment receives an instruction to invoke a static method. The instruction may be a compiled code instruction to invoke a method. The invocation instruction may include an identifier of a type including the method (e.g., a class name, or an interface name). The type including the method is an unspecialized type. In some embodiments, the invocation instruction may further include (a) an identifier of the method to be invoked (e.g., a method name), and/or (b) a method type of the method, which indicates zero or more parameter types and a return type of the method.

One or more embodiments include determining whether the invocation instruction indicates an expected specialized type that includes the static method (Operation 1106 or Operation 1116). The invocation instruction, when compiled, may have included an indication of an expected specialized type of the object whose method is invoked. The runtime environment determines whether the invocation instruction received at Operation 1002 in fact includes an expected specialized type. Examples of operations for determining whether an instruction includes an expected specialized type are described above with reference to Operation 806 or Operation 816.

If the invocation instruction has an expected specialized type (YES in Operation 1106), one or more embodiments include performing an optimized invocation of the static method based on type restrictions derived from the specialized type (Operation 1110). The runtime environment determines whether the expected specialized type indicates any type restrictions for the method parameters and/or return value. The runtime environment may perform an optimized (e.g., direct) access of the method parameters and/or return value based on the type restrictions, which results in an optimized invocation of the static method. Examples of operations for performing an optimized access based on type restrictions are described above with reference to Operation 1010.

If the invocation instruction does not have an expected specialized type (NO in Operation 1106), one or more embodiments include performing invocation of the static method based on the method type of the method as indicated by the containing unspecialized type (Operation 1120). The runtime environment determines the method type of the method as indicated by the containing unspecialized type. The runtime environment may, for example, identify the method type from a method descriptor for the method. The runtime environment determines an access method suitable for the parameter types and/or return type. The runtime environment uses the access method to access the method parameters and/or return value.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
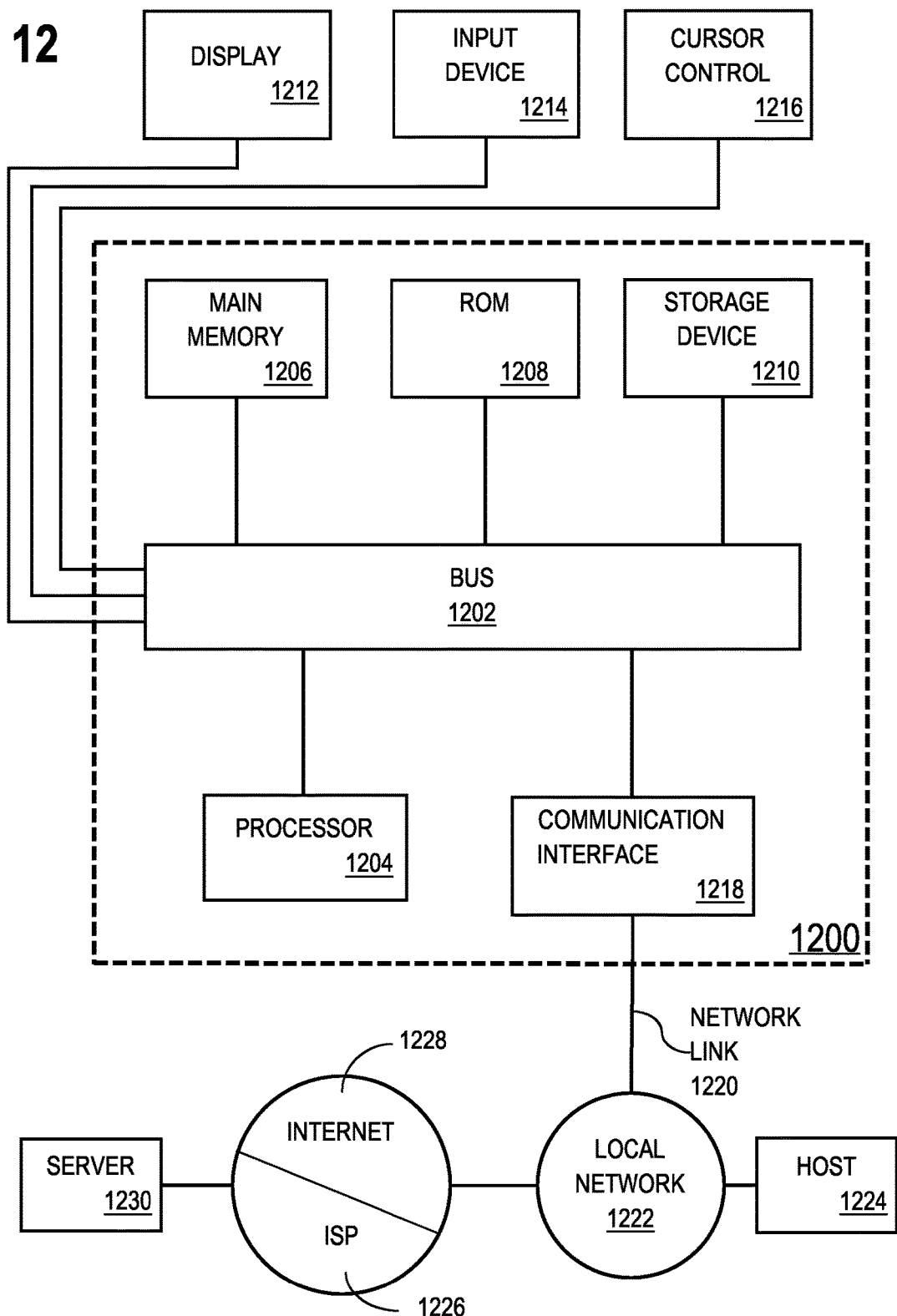
FIG. 12 illustrates a system in accordance with one or more embodiments.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable storage media storing instructions which, when executed by one or more hardware processors, cause:

identifying, by a compiler, a first source code instruction to call an application programming interface (API) point associated with a generic type;

determining, by the compiler, whether the first source code instruction indicates any parameterized type for the generic type;

responsive to determining that the first source code instruction indicates a first parameterized type for the generic type:

compiling, by the compiler, the first source code instruction to generate a first compiled source code instruction to call the API point, wherein the first compiled source code instruction indicates the first parameterized type for the generic type;

identifying, by the compiler, a second source code instruction to call the API point associated with the generic type;

determining, by the compiler, whether the second source code instruction indicates any parameterized type for the generic type; and responsive to determining that the second source code instruction does not indicate any parameterized type for the generic type:

compiling, by the compiler, the second source code instruction to generate a second compiled source code instruction to call the API point, wherein the second compiled source code instruction does not indicate any parameterized type for the generic type.

2. The one or more non-transitory computer readable storage media of claim 1, wherein generating the first compiled source code instruction to call the API point comprises:

generating a symbolic description representing the first parameterized type for the generic type; and generating the first compiled source code instruction to call the API point using the symbolic description.

3. The one or more non-transitory computer readable storage media of claim 2, wherein generating the symbolic description representing the first parameterized type for the generic type comprises:

generating a constant that includes (a) a reference to information representing the first parameterized type for the generic type and (b) a reference to the API point.

4. The one or more non-transitory computer readable storage media of claim 3, wherein generating the first compiled source code instruction to call the API point using the symbolic description comprises:

inserting a reference to the constant into a parameter to the first compiled source code instruction.

5. The one or more non-transitory computer readable storage media of claim 4, wherein generating the second compiled source code instruction to call the API point comprises:

inserting the reference to the API point into the parameter to the second compiled source code instruction.

6. The one or more non-transitory computer readable storage media of claim 1, storing the instructions which, when executed by the one or more hardware processors, further cause:

identifying, by the compiler, a third source code instruction to call the API point associated with the generic type;

determining whether the third source code instruction indicates any parameterized type for the generic type; and responsive to determining that the third source code instruction indicates a second parameterized type for the generic type:

compiling, by the compiler, the third source code instruction to generate a third compiled source code instruction to call the API point, wherein the third compiled source code instruction indicates the second parameterized type for the generic type.

7. The one or more non-transitory computer readable storage media of claim 1, wherein the API point comprises one of: a class, an interface, a method, and a field.

8. The one or more non-transitory computer readable storage media of claim 1, wherein a same set of compiled source code includes the first compiled source code instruction and the second compiled source code instruction.

9. The one or more non-transitory computer readable storage media of claim 1, wherein the first parameterized type for the generic type is associated with a type restriction applied on the API point.

10. The one or more non-transitory computer readable storage media of claim 9, wherein compiling the first source code instruction to generate the first compiled source code instruction to call the API point is responsive at least to determining that at least one of a parameter and a return value of the first compiled source code instruction complies with the type restriction applied on the API point.

11. The one or more non-transitory computer readable storage media of claim 1, wherein:

the API point called by the second compiled source code instruction is of a particular type; and the API point called by the first compiled source code instruction is of the particular type and is further restricted by a type restriction, such that a particular value that is valid for the particular type is not valid for the API point called by the first compiled source code instruction.

12. A method comprising:

identifying, by a compiler, a first source code instruction to call an application programming interface (API) point associated with a generic type;

determining, by the compiler, whether the first source code instruction indicates any parameterized type for the generic type;

responsive to determining that the first source code instruction indicates a first parameterized type for the generic type:

compiling, by the compiler, the first source code instruction to generate a first compiled source code instruction to call the API point, wherein the first compiled source code instruction indicates the first parameterized type for the generic type;

identifying, by the compiler, a second source code instruction to call the API point associated with the generic type;

determining, by the compiler, whether the second source code instruction indicates any parameterized type for the generic type; and responsive to determining that the second source code instruction does not indicate any parameterized type for the generic type:

compiling, by the compiler, the second source code instruction to generate a second compiled source code instruction to call the API point, wherein the second compiled source code instruction does not indicate any parameterized type for the generic type;

wherein the method is executed by one or more devices, and wherein each device of the one or more devices includes one or more hardware processors.

13. The method of claim 12, wherein generating the first compiled source code instruction to call the API point comprises:

generating a symbolic description representing the first parameterized type for the generic type; and generating the first compiled source code instruction to call the API point using the symbolic description.

14. The method of claim 13, wherein generating the symbolic description representing the first parameterized type for the generic type comprises:

generating a constant that includes (a) a reference to information representing the first parameterized type for the generic type and (b) a reference to the API point.

15. The method of claim 14, wherein generating the first compiled source code instruction to call the API point using the symbolic description comprises:

inserting a reference to the constant into a parameter to the first compiled source code instruction.

16. The method of claim 15, wherein generating the second compiled source code instruction to call the API point comprises:

inserting the reference to the API point into the parameter to the second compiled source code instruction.

17. A system comprising:
one or more devices, each device of the one or more devices including one or more hardware processors; and
the system being configured to perform operations comprising:
identifying, by a compiler, a first source code instruction to call an application programming interface (API) point associated with a generic type;
determining, by the compiler, whether the first source code instruction indicates any parameterized type for the generic type;
responsive to determining that the first source code instruction indicates a first parameterized type for the generic type:
compiling, by the compiler, the first source code instruction to generate a first compiled source code instruction to call the API point, wherein the first compiled source code instruction indicates the first parameterized type for the generic type;
identifying, by the compiler, a second source code instruction to call the API point associated with the generic type;
determining, by the compiler, whether the second source code instruction indicates any parameterized type for the generic type; and
responsive to determining that the second source code instruction does not indicate any parameterized type for the generic type:
compiling, by the compiler, the second source code instruction to generate a second compiled source code instruction to call the API point, wherein the second compiled source code instruction does not indicate any parameterized type for the generic type.

18. The system of claim 17, wherein generating the first compiled source code instruction to call the API point comprises:

generating a symbolic description representing the first parameterized type for the generic type; and
generating the first compiled source code instruction to call the API point using the symbolic description.

19. The system of claim 18, wherein generating the symbolic description representing the first parameterized type for the generic type comprises:

generating a constant that includes (a) a reference to information representing the first parameterized type for the generic type and (b) a reference to the API point.

20. The system of claim 19, wherein generating the first compiled source code instruction to call the API point using the symbolic description comprises:

inserting a reference to the constant into a parameter to the first compiled source code instruction.

* * * * *

UNITED STATES PATENT AND TRADEMARK OFFICE
CERTIFICATE OF CORRECTION

PATENT NO. : 11,782,774 B2
APPLICATION NO. : 17/571329
DATED : October 10, 2023
INVENTOR(S) : Rose et al.

Page 1 of 1

It is certified that error appears in the above-identified patent and that said Letters Patent is hereby corrected as shown below:

In the Specification

In Column 17, Line 20, delete ");" and insert -- );, --, therefor.

In Column 17, Line 21, delete "sfd;" and insert -- sfd;, --, therefor.

In Column 17, Line 22, delete "fd;" and insert -- fd;, --, therefor.

In Column 17, Line 24, delete ");" and insert -- );, --, therefor.

In Column 17, Line 25, delete ");" and insert -- );, --, therefor.

In Column 17, Line 27, delete "sfd;" and insert -- sfd;, --, therefor.

In Column 17, Line 28, delete "fd;" and insert -- fd;, --, therefor.

In Column 17, Line 30, delete ");" and insert -- );, --, therefor.

In Column 17, Line 39, delete ".sfd;" and insert -- .sfd;. --, therefor.

In Column 17, Line 46, delete ");" and insert -- );, --, therefor.

In Column 17, Line 47, delete ");" and insert -- );. --, therefor.

Signed and Sealed this
Twenty-fifth Day of June, 2024

Katherine Kelly Vidal
*Director of the United States Patent and Trademark Office*